（12） United States Patent
Topaloglu et al.

(10) Patent No.: US 11,593,470 B2
(45) Date of Patent: Feb. 28, 2023

(54) VOLUMETRIC DISPLAY-BASED CAPTCHA SYSTEM

(71) Applicant: International Business Machines Corporation, Armonk, NY (US)

(72) Inventors: Rasit O Topaloglu, Poughkeepsie, NY (US); Kafai Lai, Poughkeepsie, NY (US)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 16/453,945

(22) Filed: Jun. 26, 2019

(65) Prior Publication Data

US 2020/0410081 A1    Dec. 31, 2020

(51) Int. Cl.
*G06F 21/36*    (2013.01)
*G06F 9/451*    (2018.01)
*G06F 3/0481*    (2022.01)
*G06T 13/20*    (2011.01)
*G06F 3/04815*    (2022.01)

(52) U.S. Cl.
CPC .......... *G06F 21/36* (2013.01); *G06F 3/04815* (2013.01); *G06F 9/451* (2018.02); *G06T 13/20* (2013.01); *G06F 2221/2133* (2013.01)

(58) Field of Classification Search
CPC ...... G06F 21/36; G06F 9/451; G06F 3/04815; G06F 2221/2133; G06T 13/20
See application file for complete search history.

(56) References Cited

U.S. PATENT DOCUMENTS

| 9,058,580 | B1 | 6/2015 | Amtrup | |
|---|---|---|---|---|
| 9,344,283 | B2 | 5/2016 | Frank | |
| 9,576,194 | B2 | 2/2017 | Bowers | |
| 9,811,650 | B2 | 11/2017 | Todeschini | |
| 10,095,857 | B1* | 10/2018 | Mallenahally | .......... H04L 63/08 |
| 2011/0029902 | A1* | 2/2011 | Bailey | .................... G06Q 30/02 |
| | | | | 715/764 |

(Continued)

OTHER PUBLICATIONS

IrtCaptcha: A Real-Time CAPTCHA Based Liveness Detection System Uzun, E. et al.; 2018.

(Continued)

*Primary Examiner* — Tadesse Hailu
*Assistant Examiner* — Darrin Hope
(74) *Attorney, Agent, or Firm* — Jeffrey S LaBaw; Steven J Meyers; L Jeffrey Kelly

(57) ABSTRACT

A method, apparatus and computer program product for using a volumetric CAPTCHA display to verify that a human is present at a computer. Responsive to a request for a computer resource, a volumetric CAPTCHA is displayed in a user interface at the computer. The volumetric CAPTCHA has a first three dimensional (3D) feature and a second 3D feature. The user is prompted to answer a question about the first 3D feature of the volumetric CAPTCHA display. The received user response to the question is evaluated for correctness in describing the first 3D feature of the volumetric CAPTCHA. In response to the received user response being correct, the user is allowed access to the computer resource. The first 3D feature and the second 3D feature have a relationship with each other in the volumetric CAPTCHA.

20 Claims, 11 Drawing Sheets

(56) References Cited

U.S. PATENT DOCUMENTS

| | | | | |
|---|---|---|---|---|
| 2012/0291122 | A1* | 11/2012 | Chow | H04N 13/128 |
| | | | | 726/19 |
| 2017/0011212 | A1* | 1/2017 | Rowlingson | G06T 13/80 |
| 2017/0262623 | A1* | 9/2017 | Plenderleith | G06F 21/36 |

OTHER PUBLICATIONS

Method and System for Holographic Object Interaction Based on Environmental Parameters Anonymously; Jun. 29, 2016.

Mobile Holographic Meeting Solution Anonymously; Oct. 26, 2010.

CAPTCHAs cracked by new artificial intelligence, after very little training, ABC News, Web Page downloaded, Jun. 26, 2019 from https://www.abc.net.au/news/science/2017-10-27/captcha-cracking-artificial-intelligence-machine-learning/9080608.

\* cited by examiner

VOLUMETRIC DISPLAY-BASED CAPTCHA SYSTEM

BACKGROUND OF THE INVENTION

This disclosure relates generally graphical user interfaces. More particularly, it relates to a graphical user interface for authenticating individuals.

Security attacks by computers impersonating a human being are increasing in occurrence and severity. It has become conventional for a website to safeguard its information against a computer attack, that is, to validate that a human user is behind a request using a CAPTCHA (Completely Automated Public Turing test to tell Computers and Humans Apart). A common form of CAPTCHA requires that the user type the letters of a distorted image, sometimes with the addition of an obscured sequence of letters or digits that appears on the screen. While designed to be difficult for a machine to answer successfully, with the advent of modern artificial intelligence programs, existing CAPTCHA's will not be sufficient to verify the presence of a human viewer. A two-dimensional on screen image can be analyzed by an artificial intelligence (AI) algorithm. Researchers have demonstrated deep learning attacks which successfully solved the text CAPTCHAs used by the popular web sites with a high success rate. Thus, relying on existing CAPTCHA methods to validate whether a real human is behind a request will soon short fall of expectations.

Further improvements in verifying a human presence are needed.

BRIEF SUMMARY

According to this disclosure, a method, apparatus and computer program product for using a volumetric CAPTCHA display to verify that a human is present at a computer. Responsive to a request for a computer resource, a volumetric CAPTCHA is displayed in a user interface at the computer. The volumetric CAPTCHA has a first three dimensional (3D) feature and a second 3D feature. The user is prompted to answer a question about the first 3D feature of the volumetric CAPTCHA display. The received user response to the question is evaluated for correctness in describing the first 3D feature of the volumetric CAPTCHA. In response to the received user response being correct, the user is allowed access to the computer resource. The first 3D feature and the second 3D feature have a relationship with each other in the volumetric CAPTCHA.

The foregoing has outlined some of the more pertinent features of the disclosed subject matter. These features should be construed to be merely illustrative. Many other beneficial results can be attained by applying the disclosed subject matter in a different manner or by modifying the invention as will be described.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION OF AN ILLUSTRATIVE EMBODIMENT

Figure 1:
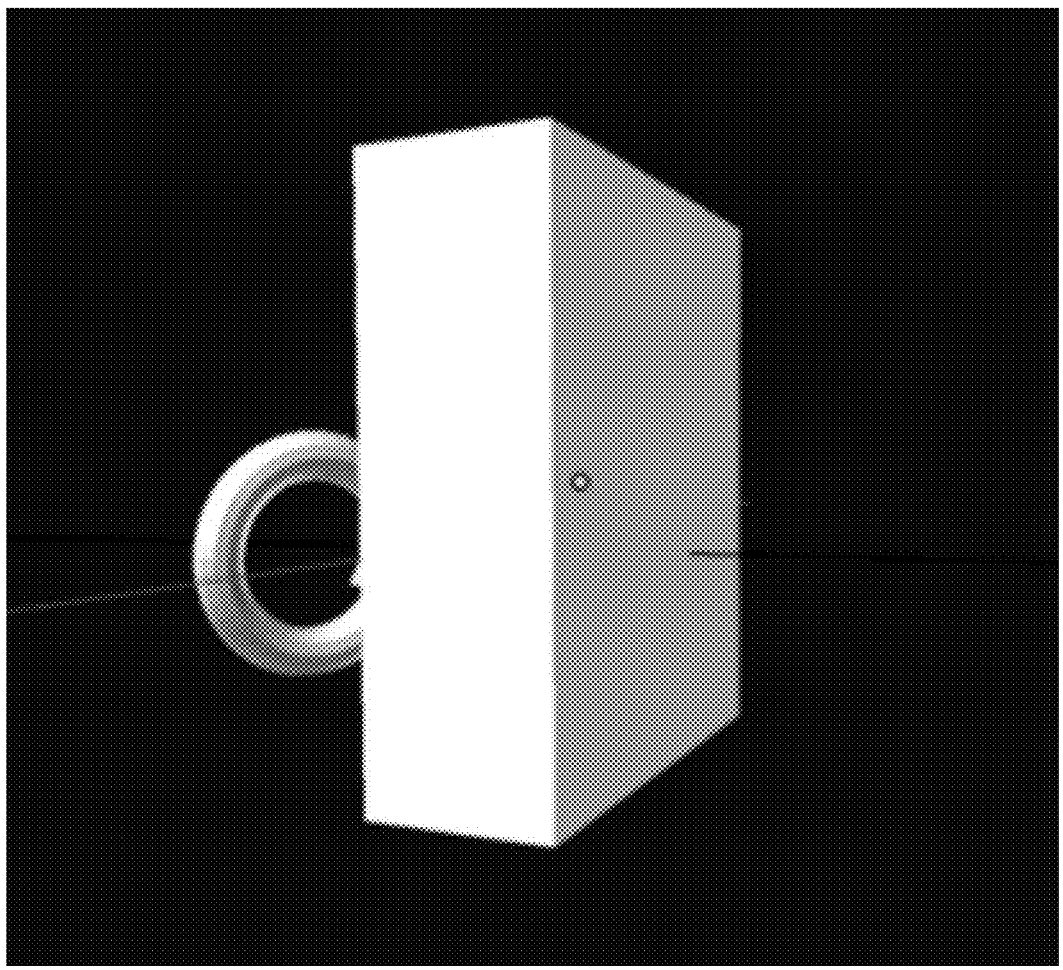
FIG. 1 shows one view of a volumetric CAPTCHA according to a preferred embodiment.

At a high level, the invention provides a method, system and computer program product which allows a user to be determined to be a human using a volumetric CAPTCHA. A volumetric CAPTCHA displays an image using points in space in a three-dimensional (3D) display. For the purposes of the invention, a "volumetric CAPTCHA display" includes holograms, holographic displays, nanophotonic arrays, plasmonic displays, lenticular or lenslet displays and all technologies in which the light scattering surface and the image point are physically separate and the display portrays a three-dimensional image. New 3D technologies which may be developed in the future are considered to be within the scope of the invention. Embodiments of the invention are part of an authentication process. Embodiments of the invention provide greater security than existing CAPTCHA's which can be successfully analyzed by (and therefore spoofed by) an artificial intelligence (AI) algorithm. Because of the added difficulties in understanding a three dimensional view, with embodiments of the invention, a human viewer is needed to observe a 3D scene to make the proper responses to the CAPTCHA.

The embodiments which will now be described more fully herein with reference to the accompanying drawings are exemplary. The invention may, however, be embodied in many different forms and should not be construed as limited to the example embodiments set forth herein. The embodiments are provided so that this disclosure conveys the principles of the invention; variations on these examples are within the scope of the invention as will be understood by those skilled in the art. In the description, details of well-known features and techniques may be omitted to avoid unnecessarily obscuring the presented embodiments.

Embodiments of the invention use a volumetric projector or volumetric display device, e.g., a holographic device, to pose challenge questions by presenting different volumetric CAPTCHA displays, i.e. three dimensional (3D) images, to determine whether there is a real human interacting with the computer. The volumetric display device may be a stand-alone device coupled to the user computer, or it may be integrated as a constituent part of a computer display and presented as part of the user interface. As part of a process to validate human presence a user is prompted to answer a question about at least one 3D feature of the volumetric CAPTCHA display. The system evaluates the user response to the question for correctness in describing the first 3D feature of the volumetric CAPTCHA. If the received user response deemed "correct", the user is allowed access to the computer resource.

In one embodiment, the user sees a 3D feature such as an object, shape, letter or number "hiding" another 3D feature such as another object, shape, letter or number in the standard point of view wherein the user is oriented directly in front of the volumetric display. In some of the embodiments, the "hidden feature" is presented as bigger than the "hiding feature" which obscures the hidden feature, so that the user can understands that there is a hidden feature. In the embodiment, the user is prompted by the system to orient themselves in another position with respect to the display so that the user can see the "hidden" feature. That is, the user is asked to look at the 3D holographic image from top, right, bottom, or left positions where they would see a different object, shape, letter or number that is hidden as compared to a frontal view of the display seen at a front position.

In another embodiment, multiple layers of transparent, translucent or see-through 3D features, e.g., objects, shapes, letters, or numbers are displayed in different layers (also 3d features) in the volumetric CAPTCHA. For purposes of the invention, the layers are also considered 3D features in the volumetric CAPTCHA. In preferred versions of the embodiment, the objects, shapes, letters, or numerals are displayed in random aspect ratios making it more challenging to decide their order. However, by moving with respect to the volumetric display, the user can determine which layer a particular feature is in. When prompted, the user can answer questions about a particular layer (which objects are in the layer) or about a particular object (which layer it is in). That is, the user is asked to tell which object, shape, letter, or numeral occurs in what order in terms of successive layers, i.e. by distance. In this embodiment, the user is asked to enter information pertaining to one or more of the objects, shapes, numerals or letters as prompted by the system.

In other embodiments, the user is asked to read see-through text that is obscured by other text. The obscuring text may be increased in size relative to the text which the user is being asked to read. The text which the user is being asked to read is perceptually located further from a default viewpoint in the volumetric display than other, obscuring features. As compared to an artificial vision system, the user can more easily decipher see-through text and read text from a given layer of the display. For example, the user may be asked to read the text on the second layer from the front.

Thus, using one of the embodiments, the system validates that a real human user is present at a computer. For example, the system may validate that there is a human present by creating a volumetric CAPTCHA which needs to be viewed from multiple angles to observe different objects, shapes, letters or numerals hidden behind other objects, shapes, letters or numerals in the "foreground". The system may ask the user to respond to a sequence of questions, e.g., where the user observations must be made from a variety of positions. The length of the sequence may depend on the correctness of the answers. Furthermore, in embodiments the system determines whether the user is human or not based on the correctness of the answers, either singly or in aggregate. The volumetric CAPTCHA is not static in some embodiments; the object, shape, letter, or numeral sizes are altered dynamically, and the user is asked a relationship question about what is displayed, either as to what is displayed at two discrete times or to describe the movement or the changing relationship between two 3D features within the volumetric CAPTCHA. In some volumetric CAPTCHAs, the rear objects are increased in size to make them look like same height as closer objects to default viewpoint to make it more difficult for a machine vision system to discriminate.

FIG. 1 shows one view of a volumetric CAPTCHA according to a preferred embodiment. In this simplified embodiment, a torus in the "background" is hidden from view by a rectangular solid in the "foreground" in the standard front view. The system asks the user to "move to the left, and describe what shape is now visible". The drawing shows the user view from left of the volumetric CAPTCHA. In a response field, the user types that she sees a "torus". Embodiments of the invention also envision a speech based natural language interface. Thus, the system query and user response are audio-based. Natural language techniques such as speech synthesis and speech recognition are well known. The user response is evaluated by the system, and if correct, the user is validated as a human.

Figure 2:
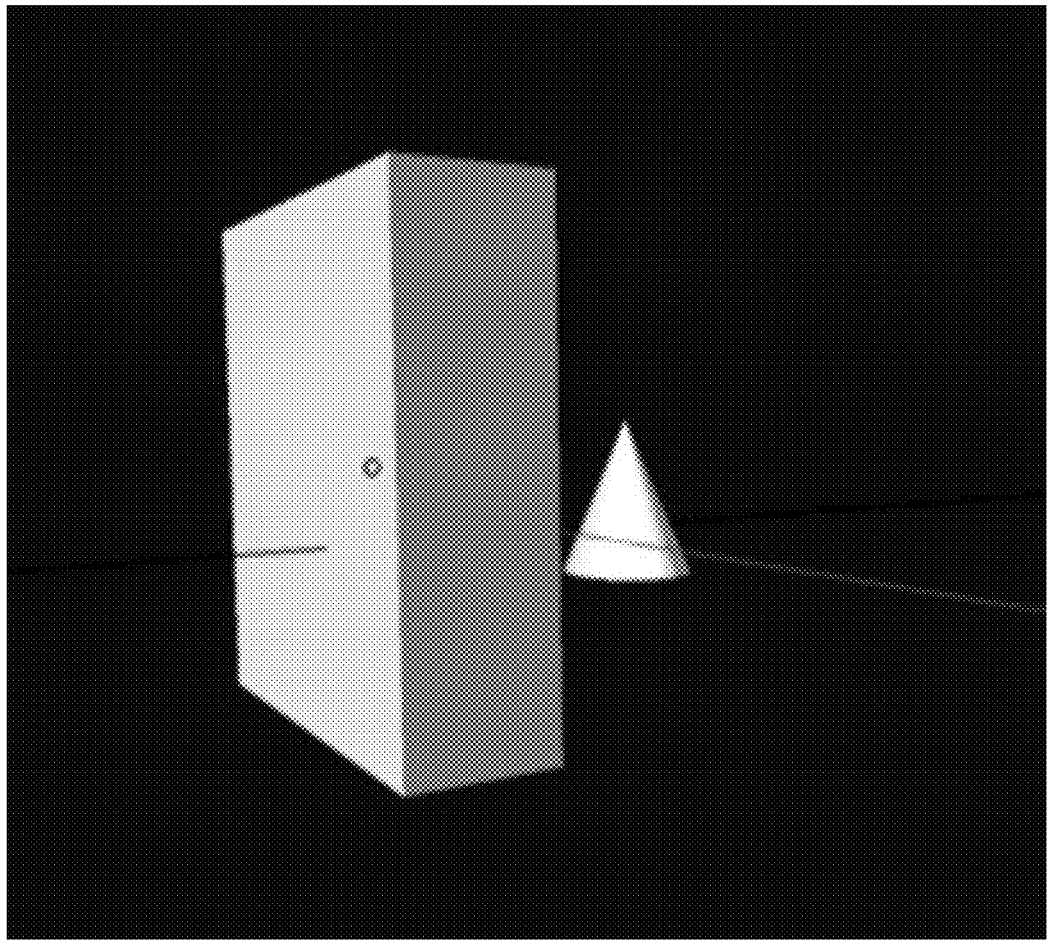
FIG. 2 shows a second view of a volumetric CAPTCHA according to a preferred embodiment.

FIG. 2 shows a second view of a volumetric CAPTCHA according to a preferred embodiment. In this simplified embodiment, a cone in the "background" is hidden from view by a rectangular solid in the "foreground" in the standard front view. The system asks the user to "move to the right, and describe what shape is now visible". The drawing shows the user view from right of the volumetric CAPTCHA. In response to the system query, the user says or types that she sees a "cone". FIGS. 1 and 2 are used to illustrate the embodiment in which objects, texts, shapes, numeral in the background are hidden from view by a "closer" object, text, shape or numeral in the background and can be revealed when a different viewpoint is used. A combination of FIGS. 1 and 2 can be considered to illustrate a sequence in which the user is asked to view the volumetric CAPTCHA from more than one position and answer more than one question about it.

Figure 3:
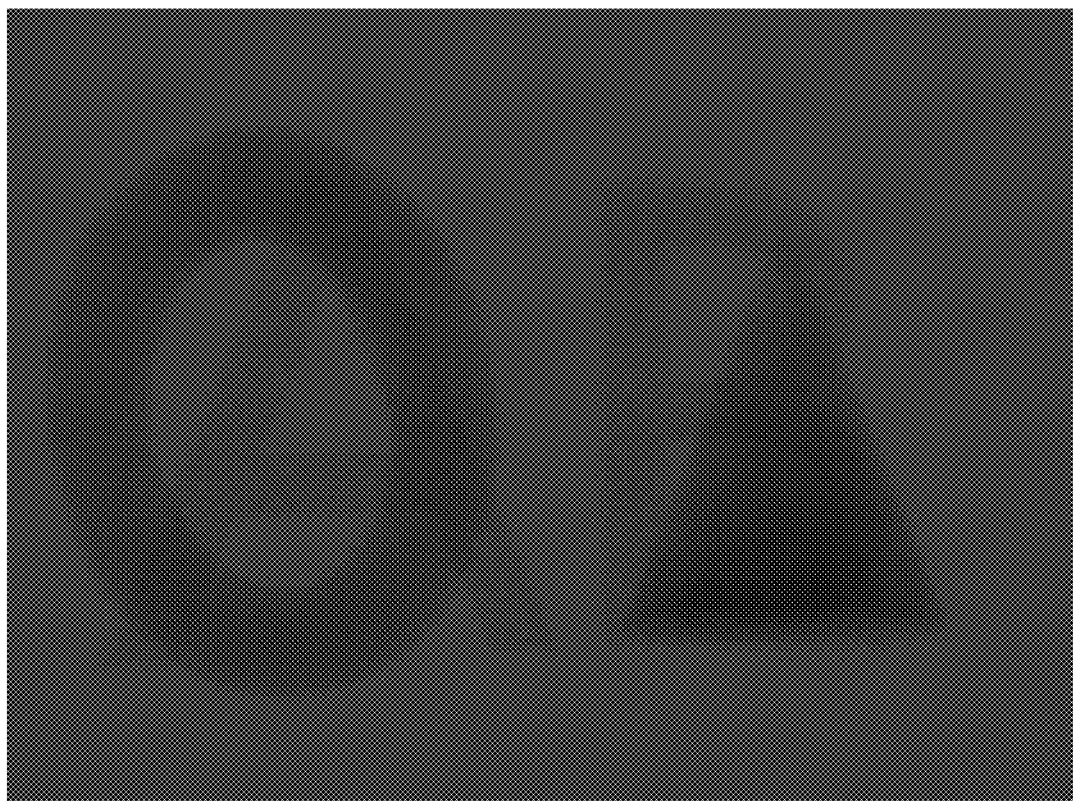
FIG. 3 shows a default, or front view of a volumetric CAPTCHA according to a preferred embodiment.

FIG. 3 shows a default, or front view of a volumetric CAPTCHA according to a preferred embodiment. Notice how the objects in the foreground, the torus and the cone, obscure the letters in the background, the letters "A" and "B". In embodiments of the invention, the foreground objects are "solid" and completely obscure background objects; in other embodiments, the objects are translucent, or "see-through" and the background objects are partially, rather than completely, obscured. For ease in illustration, only two layers of objects and letters are depicted with two objects and letters each, however, in embodiments of the invention, more layers and more objects within a layer can be used. Near layers of the CAPTCHA are used to obscure far layers.

Figure 4:
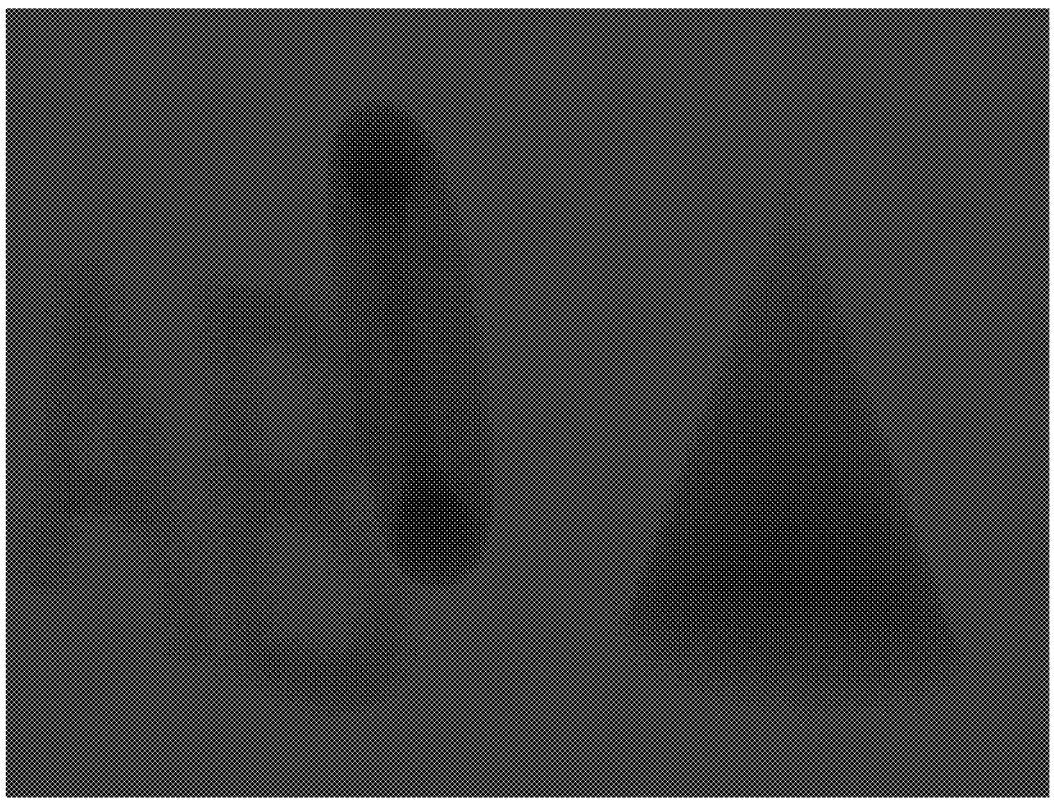
FIG. 4 shows a view from the right of a volumetric CAPTCHA illustrated in FIG. 3 according to a preferred embodiment.

FIG. 4 shows a view from a second position of a volumetric CAPTCHA illustrated in FIG. 3 according to a preferred embodiment. In embodiments, the user will receive a prompt, e.g., "View the CAPTCHA from the right. Indicate the letters present." In other embodiments, the user is expected to have familiarity with a volumetric CAPTCHA and know to move to different positions so a prompt like "Indicate the letters present in the back layer" would be given, i.e. without instructions for the user to view the volumetric CAPTCHA from a particular position. As compared to FIG. 3, notice how much easier the text is to read. In embodiments, objects, texts, shapes, numerals are placed at different distances (or layers) from the user's viewpoint, but sizes of objects, etc. in "further away" layers are increased to make them have a similar height to objects in closest layers to obfuscate the volumetric CAPTCHA for machine vision. In embodiments, see-through objects are used in one or more layers. A mixture of see-through and solid objects is used in other embodiments.

Figure 5:
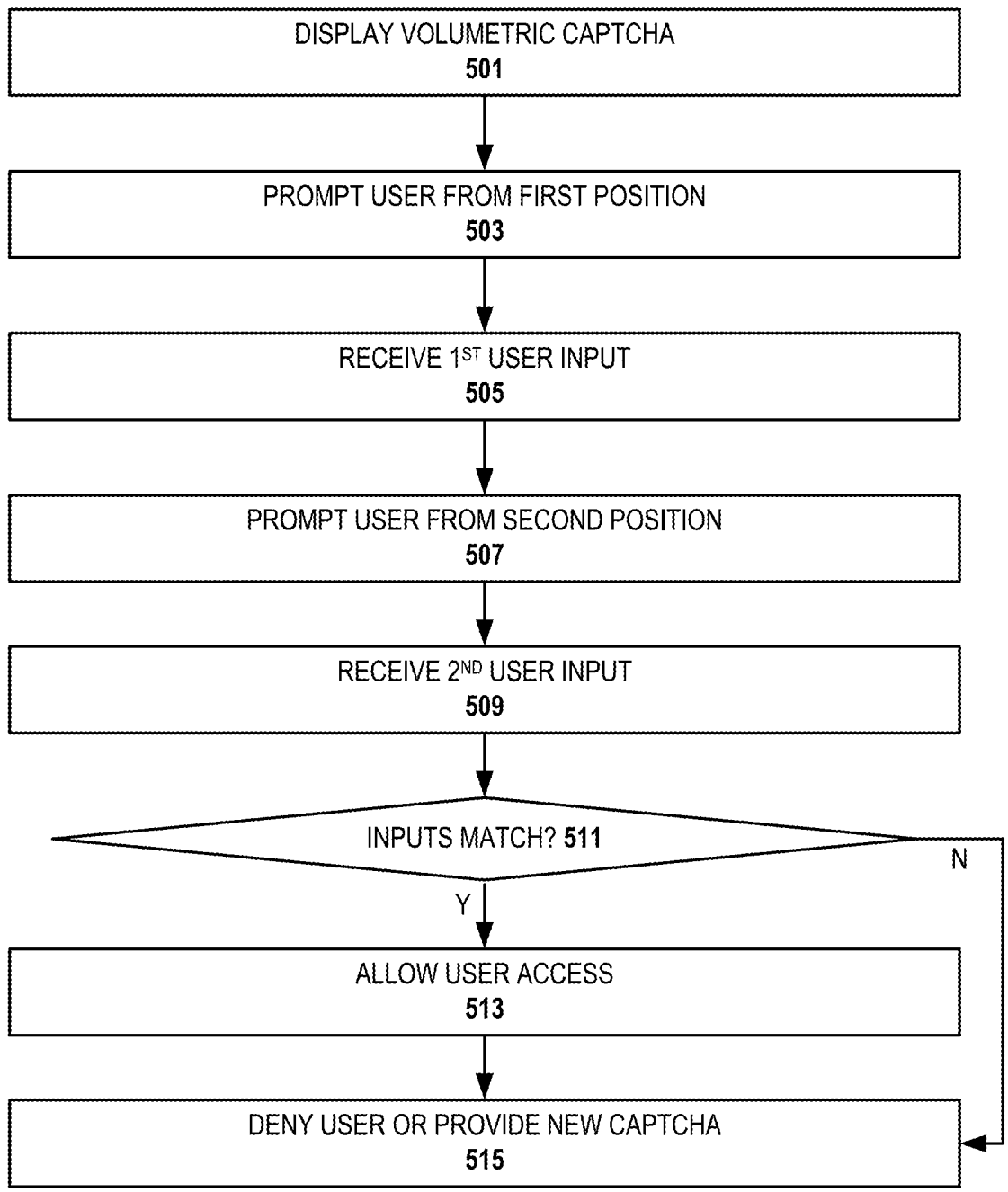
FIG. 5 is a flow diagram of the process for a first embodiment of the invention.

FIG. 5 is a flow diagram of the process for a first embodiment of the invention. In this embodiment, the invention takes advantage of the fact that in a volumetric CAPTCHA objects are only visible in certain directions. In response to user request to a computer resource, the server associated with web application will cause a selected volumetric CAPTCHA to be displayed at a client device in step 501. With the CAPTCHA displayed, the application will prompt the user to look at the CAPTCHA from a particular position and describe what the user sees, e.g., "Look at the CAPTCHA from the left, what shape do you see behind the cube" in step 503. As mentioned above, a natural language interface is used in preferred embodiments. The application prompt is a written prompt in some of these embodiments and a spoken prompt in others. In the example, the user sees a red cone so the user responds "red cone" either by typing into an entry field or speaking into a microphone. The application receives the user input in step 505.

In step 507, the process continues with the application giving the user a second prompt to look at the CAPTCHA from a second position, e.g., "Look at the CAPTCHA from the right and describe shape you see behind the cube". For example, the user sees a blue ball, and so responds by typing or speaking "blue ball" into the interface. The application receives the second user input in step 509.

Next, in step 511, the application evaluates the user input responses according to a set of rules. The rules may state that a "triangle" is equivalent to a "cone" and is an acceptable input. Another rule may indicate that the color is not a necessary component of the response and therefore, "red" and "blue" may be omitted, particularly if the volumetric display was monochromatic or the user is known to be color blind.

If the user inputs are acceptable, in step 513, the user is allowed access to the computer resource, e.g., services provided by the web application. If not, the user is denied access in step 515. As a variation of the embodiment, instead of ending the process with the user denial, it may return to step 501 and display another volumetric CAPTCHA. After a certain number of incorrect responses, the user is blocked from the web application.

Other versions of the embodiment only ask the user for a single input from a single position. Instead of asking the user to describe a relationship between 3D features, embodiments may borrow the technique of the prior art to provide a distorted, three-dimensional set of characters and numerals and request that user describe or type in the alphanumeric string. Given that the distorted alphanumeric string is likely to be obscured by other layers or that there are multiple strings in different layers, it will be difficult for machine vision to provide a correct answer.

Figure 6:
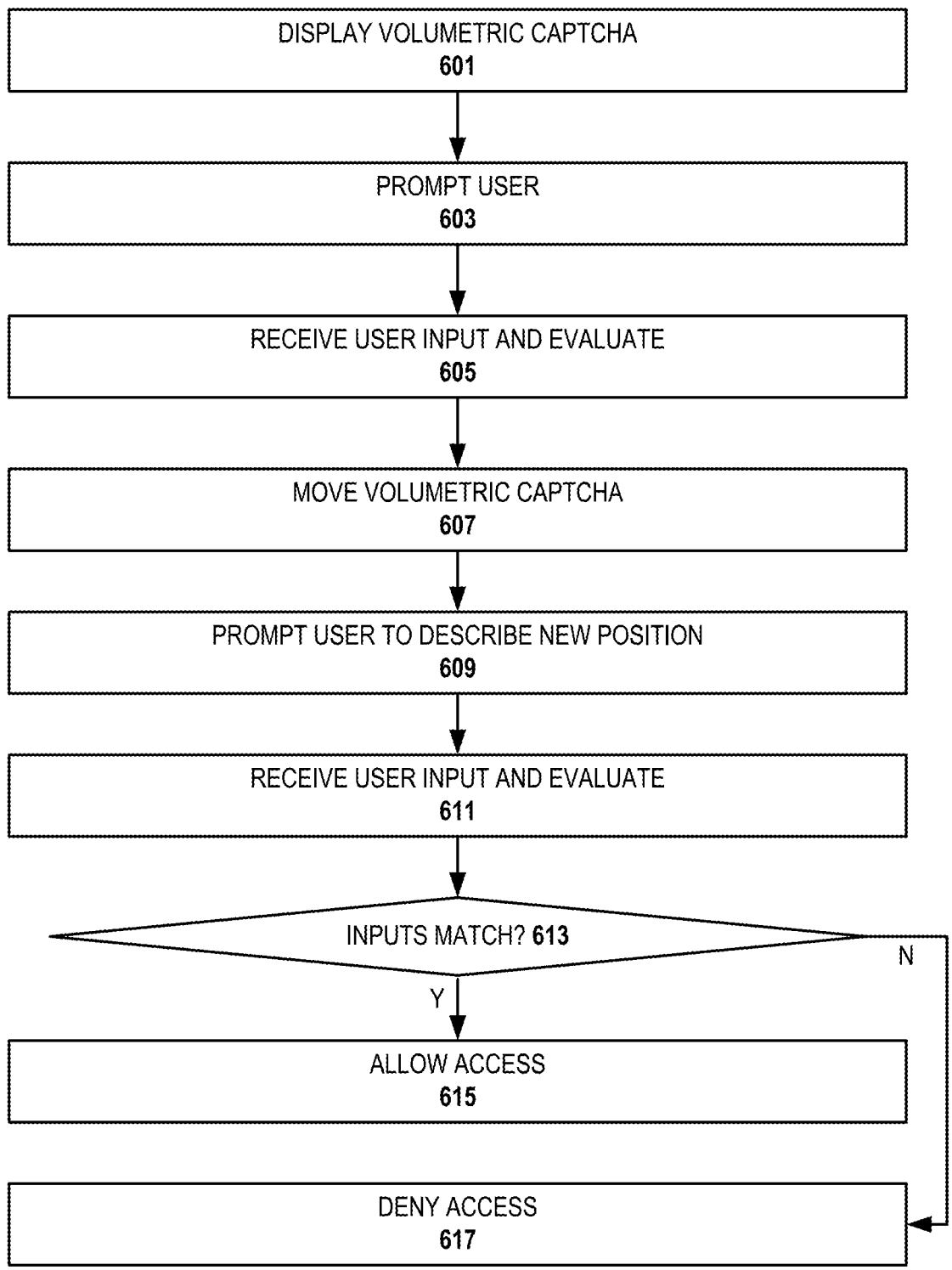
FIG. 6 is a flow diagram of the process for a second embodiment of the invention.

FIG. 6 is a flow diagram of the process for a second embodiment of the invention. In response to user request to a resource, the web application will display a selected volumetric CAPTCHA in step 601. Once the CAPTCHA is displayed, the application will prompt the user to look at the CAPTCHA in a specific way or at a present time, i.e. from a particular position, and describe what the user sees, e.g., "Look at the CAPTCHA, what characters do you see in the third layer" in step 603.

Next, in step 605, the application receives the user input and evaluates the user input response according to a set of rules. If the user inputs are acceptable, in step 807, the volumetric CAPTCHA is moved to a new configuration. For example, in a four layer CAPTCHA, the second and third layers may switch places. The user is prompted to describe the new relative position of the layers either in the present configuration or relative to the prior configuration. For example, the system may prompt "Which layers changed places" or "Please recite the alphanumeric characters in layer three" (which has changed from the first configuration).

In step 611, the application receives the user input and evaluates the user input response according to the set of rules. Given that the volumetric CAPTCHA is in a different position or that the prompt may ask the user to describe the movement, the sets of rules in steps 605 and 611 may be different.

If the user inputs match, step 613, the user is allowed access to the services provided by the web application in step 615. If not, the user is denied access in step 617.

Figure 7:
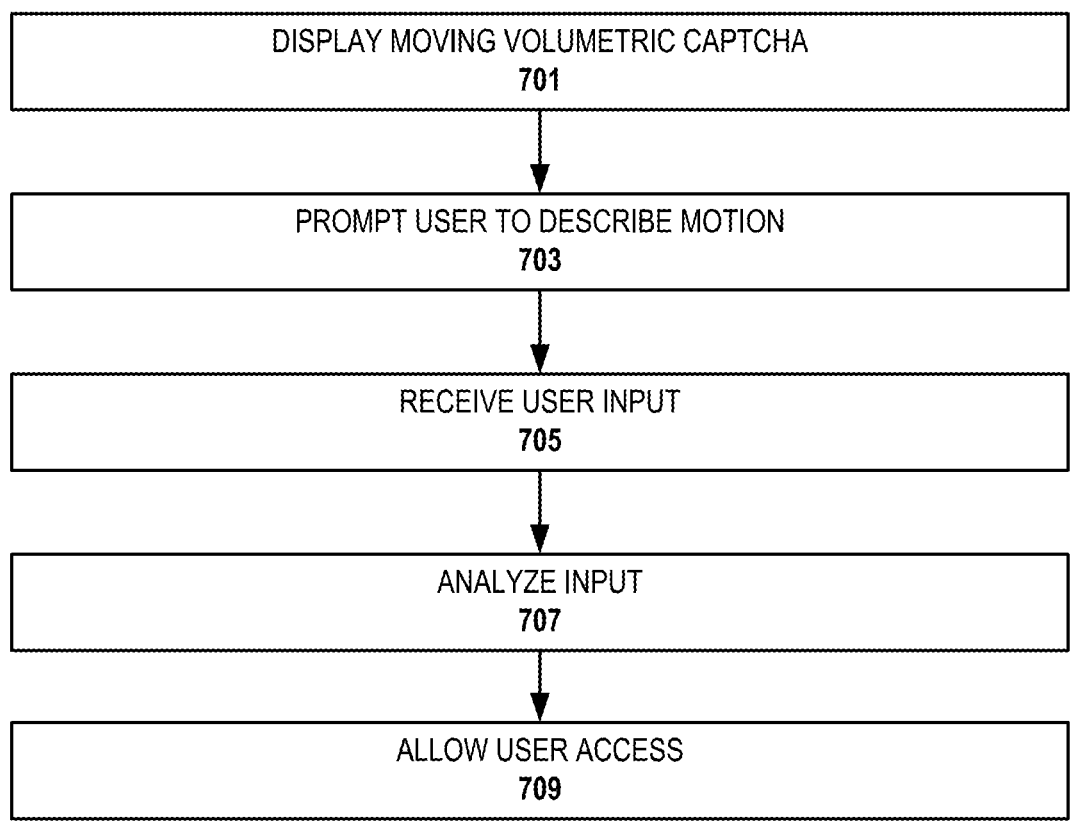
FIG. 7 is a flow diagram of the process for a third embodiment of the invention.

FIG. 7 is a flow diagram of the process for a third embodiment of the invention. In this embodiment, the volumetric CAPTCHA is moving or animated. Given the difficulty for machine vision to interpret a three dimensional space, a human being will be much more accurate in describing the motion.

In step 701, the moving volumetric CAPTCHA is displayed. Preferably, the motion will be a three dimensional motion to add to the difficulty for machine vision.

In step 703, the user is prompted to describe the motion. The user may be asked to describe a changing relationship between two 3D features. For example, the first and third layers may be alternating position and simultaneously changing shape or size. As another example, in an obscured layer two 3D features may be changing places or discrete objects may be changing places in two different layers. This would be easy for a human to describe given one or more prompts in a natural language question and user provided response (particularly a spoken response), but next to impossible for a machine learning attacker. The user input is received in step 705 and evaluated in step 707. Presuming that the user has responded appropriately according to the rules, in step 709, the user is allowed access to the computer resource.

Instead of an animated shape which changes layers, the embodiment may provide an animated and distorted, three-dimensional set of characters. For example, the characters and numerals in a particular layer could grow and shrink in size, adding to the difficulty of providing a correct response for an artificial intelligence system. The user could be questioned about the changing layer or about another layer which would be obscured by the animation of the changing layer.

Figure 8:
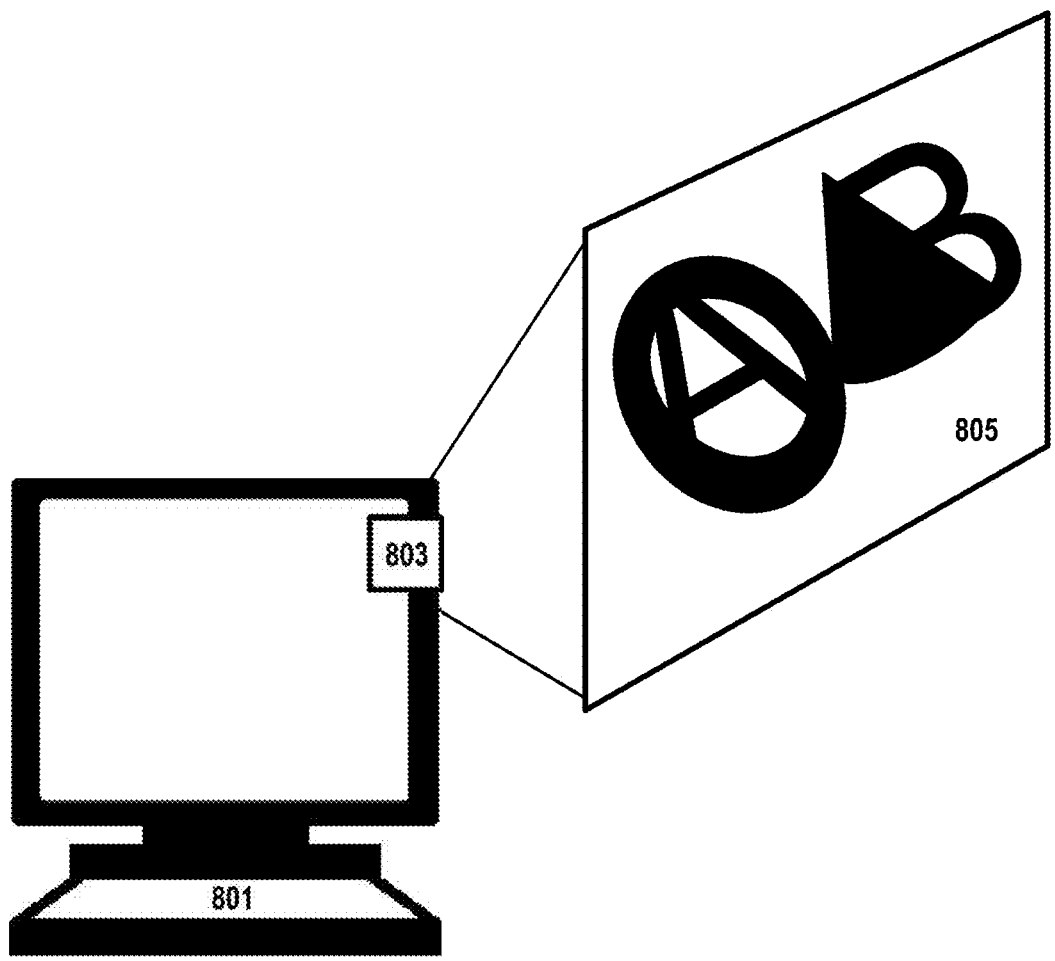
FIG. 8 illustrates a computer system equipped with a volumetric display according to one embodiment of the invention.

FIG. 8 illustrates a computer system equipped with a volumetric display according to one embodiment of the invention. Although one embodiment of the invention contemplates an integrated volumetric display, that is, the user interactions with the computer are through a three dimensional display, it is also within the scope and spirit of the invention that an adjunct volumetric display be attached to a "normal" two dimensional display. In this embodiment, most of the user interactions would be through the normal display and the authentication actions would be accomplished through the volumetric display.

A computer 801 equipped with a conventional monitor has a volumetric display 1003 embedded in the bezel of the conventional display. The conventional display would be used for normal interactions with applications which do not support 3D interfaces, while the volumetric display 803 is used to project a 3D color or black and white display 805 in mid-air for the authentication process of the present invention in addition to other three dimensional interfaces. While the inventors envision the volumetric display module to be embedded into the bezel of the conventional display, the volumetric display can be also a stand-alone peripheral, on the desktop or clipped on to the conventional monitor.

Figure 9:
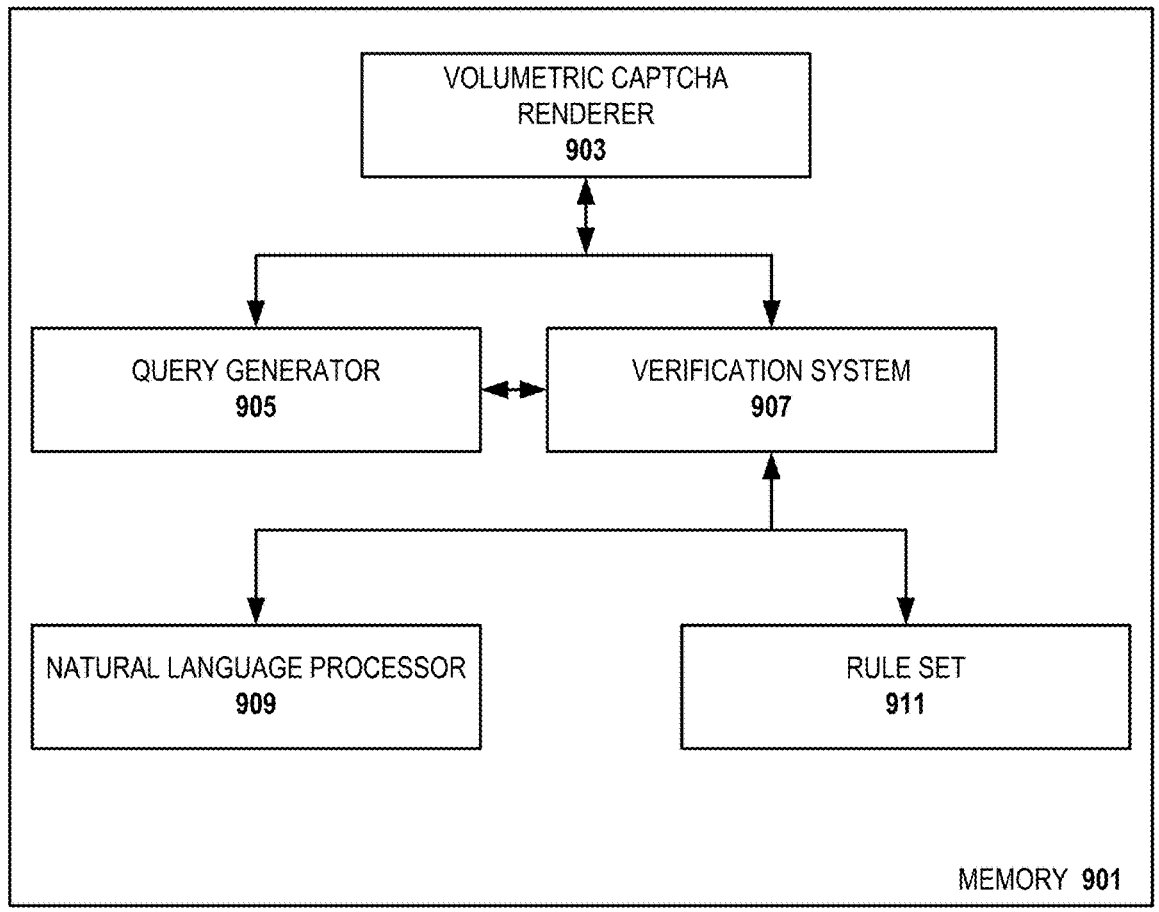
FIG. 9 is an architectural diagram of an embodiment of the invention.
Figure 10:
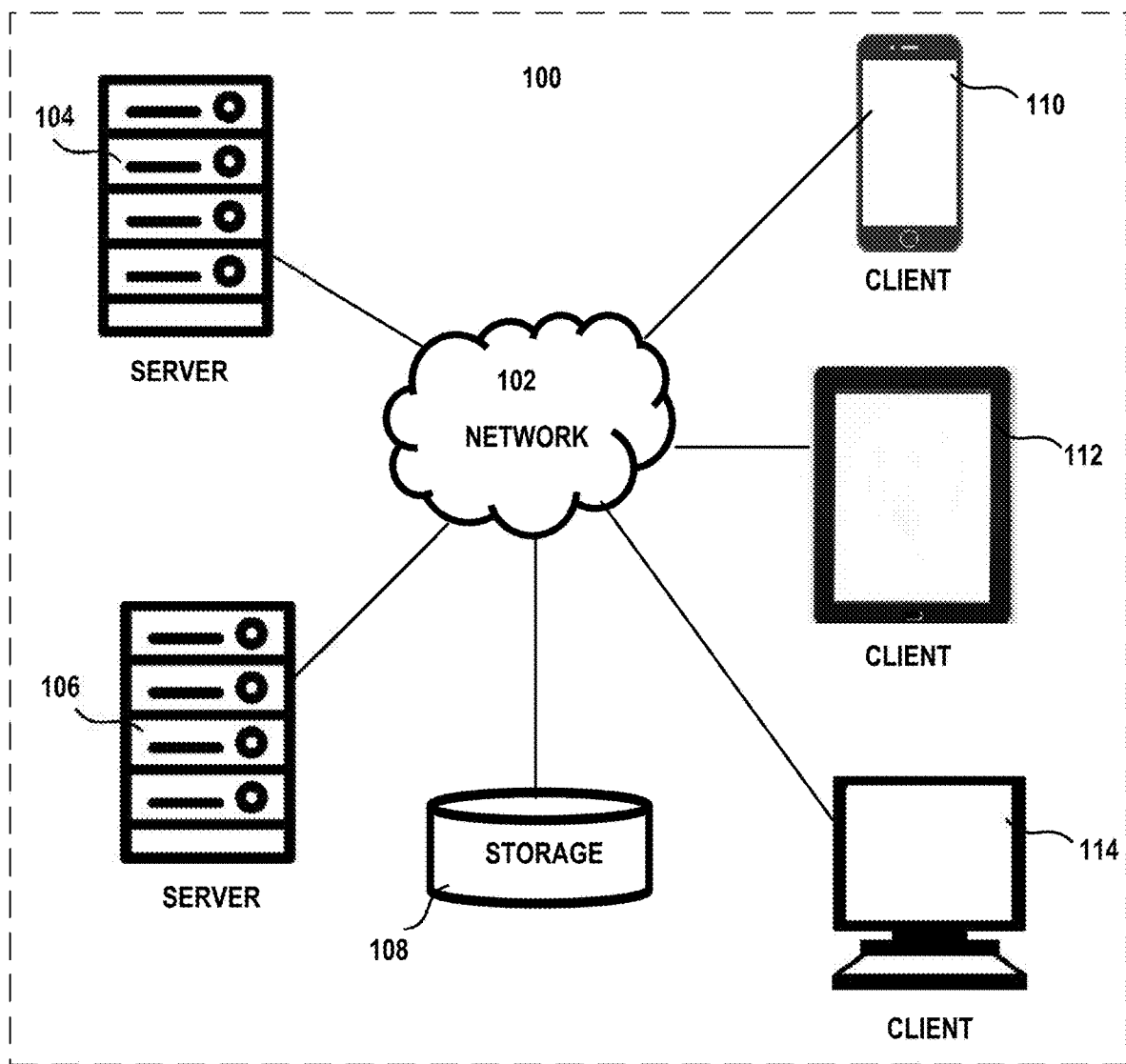
FIG. 10 depicts an exemplary block diagram of a distributed data processing environment in which exemplary aspects of the illustrative embodiments may be implemented.

FIG. 9 shows a simplified architectural diagram of the modules in a computer memory in which embodiments of the invention may be implemented. The computer memory 901 contains volumetric CAPTCHA renderer 903, Query generator 905, Verification system 907, natural language processing 909 and rule set 911 modules.

The volumetric CAPTCHA renderer 903 module is a 3D rendering program, 3D graphics program, etc.) stored in the memory 901 to be executed by a computer processor. The computer may also be equipped with a graphics processing unit (GPU) to more rapidly generate and alter the displayed three-dimensional images in the volumetric CAPTCHA on the volumetric display.

The Query generator 905 module uses the volumetric CAPTCHA generated by the volumetric CAPTCHA renderer 903 module to generate a set of questions for the user. The set of questions may comprise one or more questions about the 3D features in the volumetric CAPTCHA or their relationships of the 3D features to each other. Preferably, modules 903 and 905 communicate with each other in a format which describes the characteristics of the 3D features of the volumetric CAPTCHA, e.g., blue cube in layer 1, red sphere in layer 2, 3D character string "AbG23" in layer 3. Characteristics such as movement of the 3D features between layers or other animation characteristics would be included in embodiments.

The Verification system 907 module is in communication with the volumetric CAPTCHA renderer 903 module and the Query generator 905 module. The Verification system 907 module is typically configured for understanding whether the user response is deemed sufficiently "correct" for a human user. It receives the user response from the user interface. The Verification system 907 module converts the user response using the natural language processing (NLP) 909 module into an answer that can be evaluated against the rule set 911. The NLP 909 module would include speech recognition and text-to-speech capabilities for interacting with the user. The rule set 991 would contain rules governing which user responses are sufficiently correct.

The modules 903-911 are typically resident in a computer memory located at a server which controls a computer resource, such as a web application, to which the user is seeking access. Other embodiments of the invention will locate one or more of the modules in a memory at a client device.

One skilled in the art will understand that the division of tasks between the modules is exemplary, and that other embodiments of the invention will divide the tasks differently, e.g., into a different number of modules. Further, in describing exemplary processes, the order in which the processes are described with reference to the flow diagrams is not intended to be construed as a limitation, and any number of the described method blocks may be combined in a different order to implement the method, or alternate method. Additionally, individual blocks may be deleted from the method without departing from the spirit and scope of the subject matter described herein.

Figure 11:
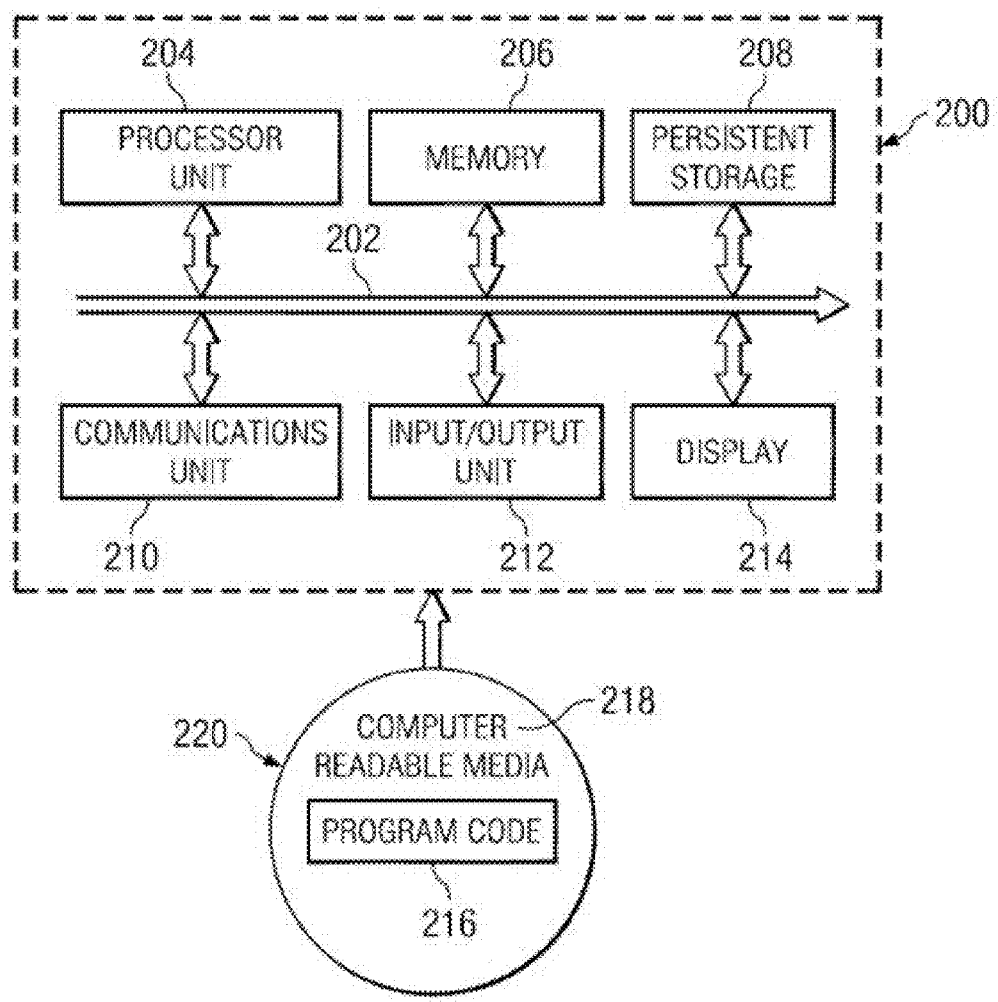
FIG. 11 is an exemplary block diagram of a data processing system in which exemplary aspects of the illustrative embodiments may be implemented.

FIGS. 11-12 are exemplary diagrams of data processing environments in which illustrative embodiments of the disclosure may be implemented. It should be appreciated that FIGS. 11-12 are only exemplary and are not intended to assert or imply any limitation with regard to the environments in which aspects or embodiments of the disclosed subject matter may be implemented. Many modifications to the depicted environments may be made without departing from the spirit and scope of the present invention.

With reference now to FIG. 11, the drawing depicts a pictorial representation of an exemplary distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with network storage unit 108. In addition, clients 110, 112, and 114 are also connected to network 102. These clients 110, 112, and 114 may be, for example, smartphones, tablet computers, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown. One or more of the server computers may be a mainframe computer connected to network 102. Mainframe computer can be, for example, an IBM System z mainframe running the IBM z/OS operating system. Connected to the mainframe may be mainframe storage unit and workstations (not pictured). The workstations can be either a personal computer connected directly to the mainframe communicating over a bus, or a console terminal connected directly to the mainframe via a display port.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the disclosed subject matter, and therefore, the particular elements shown in FIG. 1 should not be considered limiting with regard to the environments in which the illustrative embodiments of the present invention may be implemented.

With reference now to FIG. 12, a block diagram of an exemplary data processing system is shown in which aspects of the illustrative embodiments may be implemented. Data processing system 200 is an example of a computer, such as client 114 in FIG. 11, in which computer usable code or instructions implementing the processes for illustrative embodiments of the disclosure may be located.

With reference now to FIG. 12, a block diagram of a data processing system is shown in which illustrative embodiments may be implemented. Data processing system 200 is an example of a computer, such as server 104 or client 110 in FIG. 1, in which computer-usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit(s) 212 and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor (SMP) system containing multiple processors of the same type.

Memory 206 and persistent storage 208 are examples of storage devices. A storage device is any piece of hardware that is capable of storing information either on a temporary basis and/or a permanent basis. Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Further, input/output unit may provide connections to a microphone for audio input from a user and a speaker to provide audio output from the computer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer-usable program code, or computer-readable program code that may be read and executed by a processor in processor unit 204. The program code in the different embodiments may be embodied on different physical or tangible computer-readable media, such as memory 206 or persistent storage 208.

Program code 216 is located in a functional form on computer-readable media 218 that is selectively removable and may be loaded onto or transferred to data processing system 200 for execution by processor unit 204. Program code 216 and computer-readable media 218 form computer program product 220 in these examples. In one example, computer-readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer-readable media 218 also may take the form of a persistent storage, such as a hard drive, a thumb drive, or a flash memory that is connected to data processing system 200. The tangible form of computer-readable media 218 is also referred to as computer-recordable storage media. In some instances, computer-recordable media 218 may not be removable.

Alternatively, program code 216 may be transferred to data processing system 200 from computer-readable media 218 through a communications link to communications unit 210 and/or through a connection to input/output unit 212. The communications link and/or the connection may be physical or wireless in the illustrative examples. The computer-readable media also may take the form of non-tangible media, such as communications links or wireless transmissions containing the program code. The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 12 can be varied from the illustrative examples shown. As one example, a storage device in data processing system 200 is any hardware apparatus that may store data. Memory 206, persistent storage 208, and computer-readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

Computer program code for carrying out operations of the present invention may be written in any combination of one or more programming languages, including an object-oriented programming language such as Java™, Smalltalk, C++, C#, Objective-C, or the like, and conventional procedural programming languages such as Python or C. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those of ordinary skill in the art will appreciate that the hardware in FIGS. 11-12 may vary depending on the implementation. Other internal hardware or peripheral devices, such as flash memory, equivalent non-volatile memory, or optical disk drives and the like, may be used in addition to or in place of the hardware depicted in FIGS. 11-12. Also, the processes of the illustrative embodiments may be applied to a multiprocessor data processing system, other than the SMP system mentioned previously, without departing from the spirit and scope of the disclosed subject matter.

The techniques described herein may operate in conjunction within the standard client-server paradigm such as illustrated in FIG. 11 in which client machines communicate with an Internet-accessible Web-based portal executing on a set of one or more machines. End users operate Internet-connectable devices (e.g., desktop computers, notebook computers, Internet-enabled mobile devices, or the like) that are capable of accessing and interacting with the portal. Typically, each client or server machine is a data processing system such as illustrated in FIG. 12 comprising hardware and software, and these entities communicate with one another over a network, such as the Internet, an intranet, an extranet, a private network, or any other communications medium or link. A data processing system typically includes one or more processors, an operating system, one or more applications, and one or more utilities.

The present invention has advantages over the prior art. Embodiments allow a user to be authenticated as a human using a volumetric CAPTCHA which is much more difficult to analyze with machine vision and artificial intelligence. Existing CAPTCHAs do not require a human viewers; it has been demonstrated that the usual two dimensional screen images can be successfully analyzed by an AI algorithm. With the embodiments proposed above, a human viewer needs to observe the volumetric CAPTCHA to make conclusions and respond to the system.

While a preferred operating environment and use case has been described, the techniques herein may be used in any other operating environment in which it is desired to deploy services.

As has been described, the functionality described above may be implemented as a standalone approach, e.g., one or more software-based functions executed by one or more hardware processors, or it may be available as a managed service (including as a web service via a SOAP/XML or RESTful interface). The particular hardware and software implementation details described herein are merely for illustrative purposes are not meant to limit the scope of the described subject matter.

More generally, computing devices within the context of the disclosed subject matter are each a data processing system comprising hardware and software, and these entities communicate with one another over a network, such as the Internet, an intranet, an extranet, a private network, or any other communications medium or link. The applications on the data processing system provide native support for Web and other known services and protocols including, without limitation, support for HTTP, FTP, SMTP, SOAP, XML, WSDL, UDDI, and WSFL, among others. Information regarding SOAP, WSDL, UDDI and WSFL is available from the World Wide Web Consortium (W3C), which is responsible for developing and maintaining these standards; further information regarding HTTP, FTP, SMTP and XML is available from Internet Engineering Task Force (IETF).

In addition to the cloud-based environment, the techniques described herein may be implemented in or in conjunction with various server-side architectures including simple n-tier architectures, web portals, federated systems, and the like.

Still more generally, the subject matter described herein can take the form of an entirely hardware embodiment, an entirely software embodiment or an embodiment containing both hardware and software elements. In a preferred embodiment, the module functions are implemented in software, which includes but is not limited to firmware, resident software, microcode, and the like. Furthermore, the interfaces and functionality can take the form of a computer program product accessible from a computer-usable or computer-readable medium providing program code for use by or in connection with a computer or any instruction execution system. For the purposes of this description, a computer-usable or computer readable medium can be any apparatus that can contain or store the program for use by or in connection with the instruction execution system, apparatus, or device. The medium can be an electronic, magnetic, optical, electromagnetic, infrared, or a semiconductor system (or apparatus or device). Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD. The computer-readable medium is a tangible, non-transitory item.

The computer program product may be a product having program instructions (or program code) to implement one or more of the described functions. Those instructions or code may be stored in a computer readable storage medium in a data processing system after being downloaded over a network from a remote data processing system. Or, those instructions or code may be stored in a computer readable storage medium in a server data processing system and adapted to be downloaded over a network to a remote data processing system for use in a computer readable storage medium within the remote system.

In a representative embodiment, the techniques are implemented in a special purpose computing platform, preferably in software executed by one or more processors. The software is maintained in one or more data stores or memories associated with the one or more processors, and the software may be implemented as one or more computer programs. Collectively, this special-purpose hardware and software comprises the functionality described above.

In the preferred embodiment, the functionality provided herein is implemented as an adjunct or extension to an existing cloud compute deployment management solution.

While the above describes a particular order of operations performed by certain embodiments of the invention, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

Finally, while given components of the system have been described separately, one of ordinary skill will appreciate that some of the functions may be combined or shared in given instructions, program sequences, code portions, and the like.

Having described our invention, what we now claim is as follows:

1. A method for using a volumetric CAPTCHA display to verify that a human is present at a computer comprising:
   responsive to a request for a computer resource, causing a volumetric CAPTCHA display in a user interface at the computer, the volumetric CAPTCHA having a first three dimensional (3D) feature and a second 3D feature, wherein an appearance of the volumetric CAPTCHA is dependent on user viewing position with respect to the volumetric CAPTCHA display;

prompting a user to answer a question about the first 3D feature of the volumetric CAPTCHA display including an instruction to the user to view the volumetric CAPTCHA from a first user viewing position referenced from the volumetric CAPTCHA display by moving to the first viewing position;

evaluating a received user response to the question for correctness of the received user response in describing the first 3D feature of the volumetric CAPTCHA from the first user viewing position; and responsive the received user response being correct, allowing the user access to the computer resource;

wherein the first 3D feature and the second 3D feature have a 3D relationship with each other in the volumetric CAPTCHA.

2. The method as recited in claim 1, wherein the 3D relationship between the first 3D feature and the second 3D feature is different in the volumetric CAPTCHA display when viewed from the first user viewing position compared to a second user viewing position wherein the volumetric CAPTCHA display is stationary while the user moves between the first user viewing position and the second user viewing position.

3. The method as recited in claim 1, further comprising; prompting the user to answer a question about the second 3D feature of the volumetric CAPTCHA display including an instruction to the user to view the volumetric CAPTCHA from a second user viewing position referenced from the volumetric CAPTCHA display, wherein the second viewing position is a different viewing position than the first viewing position wherein the volumetric CAPTCHA display is stationary while the user moves between the first user viewing position and the second user viewing position; and evaluating a received user response to the question about the second 3D feature for correctness of the received user response in describing the second 3D feature of the volumetric CAPTCHA from the second user viewing position.

4. The method as recited in claim 1, wherein the first 3D feature is obscured by the second 3D feature from the first user viewing position.

5. The method as recited in claim 1, wherein the question asked is a 3D relationship question concerning first 3D feature and the second 3D feature.

6. The method as recited in claim 1, wherein the first 3D feature and the second 3D feature are translucent and the second 3D feature obscures the first 3D feature when viewed from the first user viewing position and the second 3D feature does not obscure the first 3D feature when viewed from a second user viewing position.

7. The method as recited in claim 1, wherein the first 3D feature is displayed in the volumetric CAPTCHA in a rear layer and the second 3D feature is displayed in the volumetric CAPTCHA in a front layer and the first 3D feature is increased in size to make the first and second 3D features have a same height when viewed from a front position.

8. The method as recited in claim 2, further comprising prompting the user to view the volumetric CAPTCHA from the second user position and answer a second question about the volumetric CAPTCHA from the second user position wherein the appearance of the volumetric CAPTCHA is dependent on user viewing position with respect to the volumetric CAPTCHA display while an image displayed by the volumetric CAPTCHA display of the volumetric CAPTCHA is independent of user viewing position.

9. Apparatus, comprising:

a processor;

computer memory holding computer program instructions executed by the processor for using a volumetric CAPTCHA display to verify that a human is present at a computer, the computer program instructions comprising:

program code responsive to a request for a computer resource for causing a volumetric CAPTCHA display in a user interface at the computer, the volumetric CAPTCHA having a first three dimensional (3D) feature and a second 3D feature, wherein an appearance of the volumetric CAPTCHA is dependent on user viewing position with respect to the volumetric CAPTCHA display referenced from the volumetric CAPTCHA display while an image displayed by the volumetric CAPTCHA display of the volumetric CAPTCHA is independent of user movement;

program code, operative to prompt a user to answer a question about the first 3D feature of the volumetric CAPTCHA display including an instruction to the user to view the volumetric CAPTCHA from a first user viewing position referenced from the volumetric CAPTCHA display;

program code, operative to evaluate a received user response to the question for correctness of the received user response in describing the first 3D feature of the volumetric CAPTCHA from the first user viewing position; and program code, operative to allow the user access to the computer resource;

wherein the first 3D feature and the second 3D feature have a 3D relationship with each other in the volumetric CAPTCHA.

10. The apparatus as recited in claim 9, further comprising:

program code, operative to prompt a user to view the volumetric CAPTCHA from the first user viewing position, wherein the first viewing position is different than a front user viewing position directly in front of the volumetric CAPTCHA display;

wherein the volumetric CAPTCHA display needs to be viewed from the first user viewing position to observe the first 3D feature, wherein the volumetric CAPTCHA display is stationary while the user moves between the front user viewing position and the first user viewing position.

11. The apparatus as recited in claim 9, wherein first 3D feature and the second 3D feature are displayed in different layers of the volumetric CAPTCHA and the volumetric CAPTCHA display is a selected one of a holographic display, a nanophotonic array, a plasmonic display, a lenticular display or a lenslet display.

12. The apparatus as recited in claim 9, further comprising:

program code, operative to prompt the user to answer a question about a particular layer of the volumetric CAPTCHA.

13. The apparatus as recited in claim 9, further comprising program code operative to ask the user to describe a changing relationship between two 3D features.

14. The apparatus as recited in claim 9, wherein the first 3D feature is obscured by the second 3D feature at the first user viewing position, further comprising program code, operative to prompt the user to answer a question about the first 3D feature at a second user viewing position referenced from the volumetric CAPTCHA display, wherein the second viewing position is a different viewing position than the first viewing position where the first 3D feature is not obscured by the second 3D feature.

15. A computer program product in a non-transitory computer readable medium for use in a data processing system, the computer program product holding computer program instructions executed by the data processing system for using a volumetric CAPTCHA display to verify that a human is present at a computer, the computer program instructions comprising:
    program code responsive to a request for a computer resource for causing a volumetric CAPTCHA display in a user interface at the computer, the volumetric CAPTCHA having a first three dimensional (3D) feature and a second 3D feature, wherein an appearance of the volumetric CAPTCHA is dependent on user viewing position with respect to the volumetric CAPTCHA display;
    program code, operative to prompt a user to answer a question about the first 3D feature of the volumetric CAPTCHA display including an instruction to the user to view the volumetric CAPTCHA from a first user viewing position referenced from the volumetric CAPTCHA display by moving to the first user position while the volumetric CAPTCHA display is stationary;
    program code, operative to evaluate a received user response to the question for correctness of the received user response in describing the first 3D feature of the volumetric CAPTCHA from the first user viewing position; and
    program code, operative to allow the user access to the computer resource;
    wherein the first 3D feature and the second 3D feature have a 3D relationship with each other in the volumetric CAPTCHA.

16. The computer program product as recited in claim 15, wherein the first user viewing position the volumetric CAPTCHA display needs to be viewed from is a user viewing position other than a front user viewing position directly in front of the volumetric display for the user to be able to observe the first 3D feature.

17. The computer program product as recited in claim 15, wherein the volumetric CAPTCHA is animated and the 3D relationship between the first 3D feature and the second 3D feature is changing in time and the user is prompted to answer a question about how the 3D relationship changes in time.

18. The computer program product as recited in claim 16, further comprising;
    program code operative to prompt the user to answer a question about the second 3D feature of the volumetric CAPTCHA display including an instruction to the user to view the volumetric CAPTCHA from a second user viewing position referenced from the volumetric CAPTCHA display, wherein the second viewing position is a different viewing position than the first viewing position; and
    program code operative to evaluate a received user response to the question about the second 3D feature for correctness of the received user response in describing the second 3D feature of the volumetric CAPTCHA from the second user viewing position.

19. The computer program product as recited in claim 15, wherein the volumetric CAPTCHA is animated so that the first 3D feature and the second 3D feature change the 3D relationship with each other and the question is about the change in the 3D relationship between the first 3D feature and the second 3D feature.

20. The computer program product as recited in claim 15, wherein the first 3D feature and the second 3D feature are layers in the volumetric CAPTCHA, the second 3D feature obscures the first 3D feature at a first time and the volumetric CAPTCHA is animated so that the first 3D feature and the second 3D feature change positions so that the first 3D feature obscures the second 3D feature at a second time and the question is about a change in the 3D relationship between the first 3D feature and the second 3D feature.

* * * * *